July 13, 1965     O. G. GARNER     3,194,872
PAPER AND POLYOLEFIN POWER CABLE INSULATION
Filed April 23, 1963
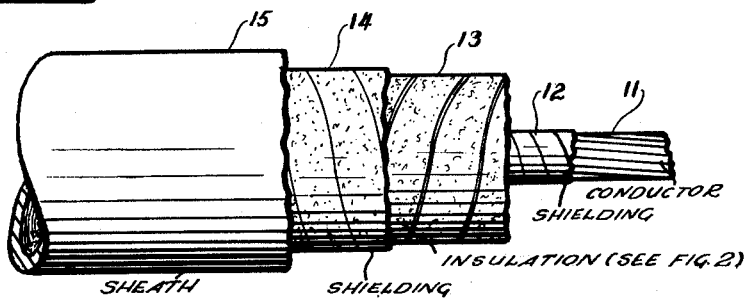
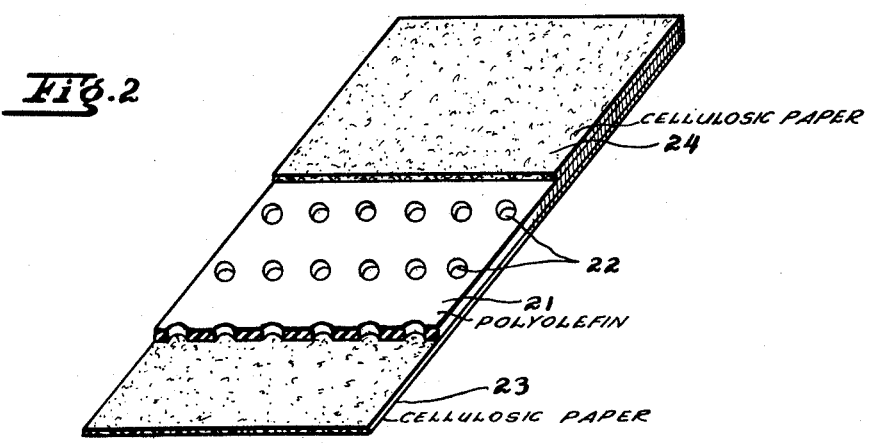
INVENTOR.
OSCAR G. GARNER
BY
ATTORNEYS

3,194,872
PAPER AND POLYOLEFIN POWER CABLE INSULATION

Oscar G. Garner, Westfield, N.J., assignor to General Cable Corporation, New York, N.Y., a corporation of New Jersey
Filed Apr. 23, 1963, Ser. No. 275,154
21 Claims. (Cl. 174—25)

This invention relates to insulated electric power cables suitable for the economical transmission of electricity over long distances at high voltages, and to insulating material for insulating such cables. More particularly, the invention relates to composite insulation wrapping material comprising layers of cellulosic paper and polyolefin bonded together, both outside layers of the wrapping material being paper, and to cable insulated with tape wrappings of this composite material. The composite insulation wrapping material is characterized by the polyolefin having a multiplicity of substantially uniformly distributed small perforations, and by the paper being porous, but unperforated.

Basically, a high voltage insulated power cable comprises one or several conductors insulated, usually including electrostatic shielding, to withstand the desired electrical stress and enclosed within an impervious metal casing or sheath. This outer metal covering commonly is an extruded sheath, for example of lead or aluminum, or it is a pipe line into which the insulated conductors are drawn. For operating voltages in excess of 15,000 volts (15 kv.) the presently preferred type of insulation consists of oil-impregnated paper tapes applied in overlying helically wrapped layers on the conductors to a sufficient wall thickness to withstand the electrical stress. For voltages in excess of about 33 kv. this is the only type of insulation which has thus far been found practical.

Oil-impregnated paper insulation in common use has a dissipation factor in the range of about 0.25% to 0.50% and an average dielectric constant of about 3.7. Recent development has resulted in the production of oil-impregnated paper insulation having dissipation factors as low as 0.15%, with a dielectric constant of about 3.4. Based on present knowledge, further substantial improvement of these properties for oil-impregnated paper insulation seems unlikely.

As cable operating voltage increases, low dielectric loss becomes increasingly important. Dielectric loss is a direct function of dielectric constant, dissipation factor and the square of the voltage. Since the dielectric constant for a given type of insulation is essentially the same at all voltages, we may for the moment consider only the other two factors as influencing dielectric loss. Thus, with a given dissipation factor, the dielectric loss at 230 kv. is 2.77 times as great as at 138 kv. ($(230/138)^2 = 2.77$); at 345 kv. it is 6.25 times as great as at 138 kv.; and at 500 kv. it is 13.1 times as great as at 138 kv. These ratios are for cables of the same dimensions. Actually, more insulation will be used as the voltage increases, with corresponding decrease in capacitance, so that comparative losses at higher voltages will not be as great as indicated, but will still be greater by very large factors.

The effect of high dielectric loss on a cable system is to reduce the amount of power which can be transmitted. In a typical installation at 138 kv., for instance, a dissipation factor of 0.25% will reduce the megavolt-ampere (mva.) rating by only a few percent over what it would be with zero dielectric loss. At 230 kv. the reduction in the mva. rating will be about 20%, and at 380 kv. it will be about 50%. At 500 kv. a dissipation factor of 0.25% will make it virtually impossible to transmit any power at all.

It is therefore evident that in order to make possible efficient transmission of power through cables at very high voltages the dissipation factor of the insulation must be reduced well below the commonly attained value of about 0.25%, and preferably below the presently best attainable value of 0.15% in the case of oil-impregnated cable.

Synthetic materials are available which have dielectric constants lower than that of paper, and dissipation factors in the range of 0.01% to 0.05%. For such materials to be suitable for high voltage cable insulation they must be capable of being applied in tape form and, in order to eliminate or minimize ionization, it must be possible for the gas trapped between the layers and in the helical butt spaces between the turns of a layer to be removed by evacuation and replaced with oil, or inert gas such as nitrogen, at high pressure, say 14 atmospheres. None of the electrically suitable synthetic materials presently available have mechanical properties which permit application and treatment in this manner. In all cases the modulus of elasticity of these synthetic materials is so low, i.e. the material is so "stretchy," that when the tapes are applied they stretch and sink down into underlying butt spaces and (1) greatly impede or entirely preclude evacuation and movement of oil or gas through the insulation, and (2) make it difficult or impossible for the tapes to slide over one another when the cable is bent, resulting in stretching and wrinkling the tapes in the overlying and underlying butt spaces. Stretching and wrinkling both are instrumental in reducing the dielectric strength of the tapes. Inability of oil or gas to pass freely through the insulation results in incomplete evacuation and in the formation of ionizable spaces, thereby defeating the advantages of using the laminated structure.

Attempts have been made to take partial advantage of the lower dielectric losses of selected synthetic tapes by applying alternately paper tapes and synthetic tapes. While the resulting structure has generally shown some improvement over an all-synthetic tape construction, the results have not been satisfactory. During application the synthetic tape stretches and sinks down into the butt spaces of the underlying paper tape wrapping.

It is an object of this invention to provide a new and improved cable construction which is capable of operation at very high voltages. It also is an object of this invention to provide a cable construction which may be operated at very high voltages with low dielectric loss. Another object of this invention is to provide an improved cable insulation of low dielectric constant and low dissipation factor as compared with the best paper insulations presently available. It is a further object of this invention to provide these improved electrical values without losing the proven mechanical advantages of tapes having a paper surface. These and other objects and advantages of the invention will become apparent as the description proceeds in connection with the accompanying drawings, wherein:

FIGURE 1 is an elevation of a cable embodying the invention, with the elements cut back progressively to disclose the construction; and FIGURE 2 is a perspective view of a composite insulating tape made in accordance with the present invention and embodied in the cable of FIGURE 1.

It is the purpose of the present invention to take partial advantage of the low dielectric loss of polymerized unsaturated hydrocarbons of the type $C_nH_{2n}$ double bond ethylene series. These polyolefin materials, for example polyethylene and polypropylene, are embodied in composite tapes consisting partly of cellulosic paper and partly of polyolefin, combined in such manner as to retain the pertinent physical properties of paper alone, while taking advantage of the better electrical properties of the polyolefin. The preferred method of accomplishing this is to use a tape consisting of a film of polyolefin sandwiched between two paper tapes, the polyolefin film being integrally bonded to the paper tapes. Preferably, the polyolefin film should be between about one-third and two-thirds of the overall thickness of the laminated tape. For example, a 6-mil tape might consist of a 2-mil polyolefin film sandwiched between two 2-mil paper tapes, or it might consist of a 4-mil polyolefin sandwiched between two 1-mil paper tapes.

It should be noted that a composite tape consisting of one paper tape laminated to one polyolefin tape, or of a paper tape sandwiched between two polyolefin tapes, will not be satisfactory, because the polyolefin surface will enter and obstruct the overlying and underlying butt spaces in essentially the same manner as an all-polyolefin tape does. It is essential to the present invention that both surfaces of the composite tape should be paper, thereby producing in the composite tape the pertinent external physical properties of an all-paper tape.

The tabulations below show relative dielectric properties of oil-impregnated paper, of polyolefin alone, and of three paper-polyolefin composites made according to the present invention. Table I is for commonly used paper insulation having a dielectric constant of 3.7 and a dissipation factor of 0.25%. Table II is for lowest loss paper insulation now available, having a dielectric constant of 3.4 and a dissipation factor 0.15%.

Table I

| Material | Dielectric Constant | Dissipation Factor | Loss Factor | Relative Dielectric Los |
|---|---|---|---|---|
| Paper | 3.7 | 0.25 | $9.25 \times 10^{-3}$ | 1.00 |
| Polyolefin | 2.2 | 0.03 | $0.66 \times 10^{-3}$ | 0.07 |
| ⅔ Paper, ⅓ Polyolefin | 3.2 | 0.18 | $5.65 \times 10^{-3}$ | 0.61 |
| ½ Paper, ½ Polyolefin | 2.95 | 0.14 | $4.13 \times 10^{-3}$ | 0.45 |
| ⅓ Paper, ⅔ Polyolefin | 2.7 | 0.10 | $2.79 \times 10^{-3}$ | 0.30 |

Table II

| Material | Dielectric Constant | Dissipation Factor | Loss Factor | Relative Dielectric Loss |
|---|---|---|---|---|
| Paper | 3.4 | 0.15 | $5.10 \times 10^{-3}$ | 1.00 |
| Polyolefin | 2.2 | 0.03 | $0.66 \times 10^{-3}$ | 0.13 |
| ⅔ Paper, ⅓ Polyolefin | 3.0 | 0.11 | $3.30 \times 10^{-3}$ | 0.65 |
| ½ Paper, ½ Polyolefin | 2.8 | 0.09 | $2.52 \times 10^{-3}$ | 0.49 |
| ⅓ Paper, ⅔ Polyolefin | 2.6 | 0.07 | $1.82 \times 10^{-3}$ | 0.36 |

In the composite insulating tape of this invention the polyolefin film should be perforated with small perforations occupying in the aggregate preferably between 1 and 10% of the total area. The purpose of these perforations is to promote drying, evacuation, and oil-impregnation of the insulation after it has been applied to the conductor. If the perforations are sufficiently small, say not over about 1/32″ in diameter, they will not impair the dielectric strength of the tapes significantly. The perforations preferably are uniformly distributed over the area of the polyolefin film and they may be of any desired regular shape, or they may be of irregular shape.

The lamination and bonding of the two paper sheets to the surfaces of the polyolefin sheet between them may be accomplished by passing the interleaved sheets over or between a succession of heated steel rolls such as are used in paper making. Use of an adhesive between the interleaved sheets may be unnecessary to secure bonding, but is permisisble provided the adhesive used is one which does not adversely affect the electrical and physical properties of the insulating tape. Examples of such adhesives are those based on high viscosity polybutene or polyisobutylene oils and solids. The sheets preferably are of suitable convenient width, for example 24 to 36 inches. The laminated sheet is taken up in suitable fashion into jumbo rolls, up to say about 30 inches in diameter, and subsequently is slit into tape of desired width, for example ¾ to 1 inch. The temperature of the steel rolls would depend on the particular polyolefin used. For example, it may be of the order of 100° to 110° C. for polyethylene, and of the order of 130° to 140° for polypropylene.

In the manufacture of a cable a multiplicity of insulating tapes, the number depending upon the voltage for which the cable is intended, are applied over a conductor by a conventional cable taping machine. Each tape is applied helically with a small gap, or butt space, between successive convolutions. Each succeeding tape is applied so as to cover the butt space of the underlying tape. The conductor and insulation may be electrostatically shielded in accordance wtih conventional practice.

FIGURE 1 shows by way of illustration a single conductor cable. Conductor 11 is electrostatically shielded, for example by one or more helical wrappings 12 of metallized paper or carbon black tape. Over the conductor shielding is the built-up body 13 of overlying helically wrapped insulating tapes made according to this invention, and illustrated to enlarged scale in FIGURE 2. Over the insulation is the insulation shielding 14, which may be similar to the conductor shielding. In the illustrative embodiment the insulated and shielded core is enclosed in an extruded sheath 15, for example lead or aluminum.

The laminated insulating tape is shown in FIGURE 2, the thickness of the laminations being exaggerated for purposes of better illustrating the construction. The polyolefin layer 21 is provided with uniformly distributed openings 22 over its entire surface. These openings, shown round in shape, might be of any regular shape, or of irregular shape. As long as the perforations are not more than about 1/32″ in diameter they will not impair the dielectric strength of the tapes any more than will the helical butt space between the turns of a wrapped layer. The aggregate area of the spaces desirably is not less than about 1%, or more than about 10% of the area of the layer.

Bonded to the opposite faces of the polyolefin layer are the porous, unperforated cellulosic paper layers 23 and 24. In FIGURE 2 the layers of the insulating tape are cut back progressively in order to show the construction better. The paper layers can be much thinner than the polyolefin layer and still supply the desired mechanical properties to the laminated tape. By having the tape surfaces of paper the likelihood of stretching the tape under normal cable taping procedures is substantially reduced, the likelihood of one tape blocking the helical butt space of the underlying and overlying layers is substantially eliminated, and slippage of one wrapped layer on another is possible in substantially the same manner as in all paper insulated cable.

After the desired number of tapes has been applied the cable is placed in a drying oven and moisture and entrapped air are removed from the insulation by application of high temperature and vacuum. The air and water vapor travel partly in zig-zag fashion between the tapes and in the butt spaces, and partly radially through the paper pores and the perforations in the polyolefin tapes. After drying has been completed the oven is filled with impregnating oil under pressure. The oil travels into the insulation through the same channels as described for removal of air and moisture. Obviously, the paths between the tapes and through the butt spaces must not be obstructed as they would be if ordinary polyolefin tapes were used, either in entirety, or alternating with paper tapes.

Upon completion of the impregnation operation the cable would ordinarily be either lead or aluminum sheathed and operated under low oil pressure, or it would be installed unsheathed in steel pipe, which would be filled with oil or chemically inert gas at high pressure. In either case oil or gas must be able to move freely into and out of the insulation during temperature changes incident to load cycles. Again, the paths between tapes and through butt spaces must be unobstructed.

From the foregoing description it will be apparent that the improved insulating material of this invention can be employed for insulating cables without sacrificing any of the advantages inherent in an all-paper insulated cable, while at the same time taking advantage of the better electrical characteristics of the polyolefins to permit economical transmission of electricity over long distances and at very high voltages.

While this invention has been described and illustrated herein with special reference to preferred embodiments thereof, it is to be understood that changes and modifications may be made without departing from the spirit or scope of the invention as defined by the appended claims.

The term "polyolefin" is used in the description and claims to mean the group of materials consisting of polyethylene (polymerized ethylene), polypropylene (polymerized propylene), and copolymers of ethylene, propylene, and other monomers. In the examples of Tables I and II the polyolefin was polyethylene, but the comparisons are not significantly different for polypropylene.

I claim:

1. An electric insulating material comprising a composite cellulosic paper and polyolefin wrapping material made up of two layers of cellulosic paper and an interposed layer of polyolefin, the said layers being bonded together throughout their extent.

2. An electric insulating material according to claim 1 in which the polyolefin is polyethylene.

3. An electric insulating material according to claim 1 in which the polyolefin is polypropylene.

4. An electric insulating material according to claim 1 in which the polyolefin layer has openings therethrough for the passage of fluid.

5. An electric insulating material according to claim 4 in which the polyolefin layer has a multiplicity of substantially uniformly distributed small perforations.

6. An electric insulating material according to claim 5 in which the individual perforations do not exceed about $1/32$ of an inch in diameter.

7. An electric insulating material according to claim 5 in which the aggregate area of the perforations in the polyolefin layer is between about 1% and 10% of the total area of the layer.

8. An electric insulating material according to claim 1 in which the polyolefin layer makes up at least one-third of the tape thickness.

9. An electric insulating material according to claim 1 in which the polyolefin layer comprises from about one-third to about two-thirds of the tape thickness.

10. An electric insulating wrapping material comprising interleaved layers of cellulosic paper and polyolefin bonded together, the outside layers both being paper.

11. An electric insulating material according to claim 10 in which the polyolefin has openings therethrough for the passage of fluid.

12. An electric insulating material according to claim 11 in which the polyolefin has a multiplicity of substantially uniformly distributed small perforations.

13. An electric power cable comprising a conductor surrounded by a plurality of overlying helical wrappings of dielectric tapes laid with the edges of adjacent turns of a wrapping spaced slightly from each other, an impervious enclosure for the insulated conductor, and a dielectric fluid under pressure filling the enclosure, characterized by the fact that the dielectric tapes are composite cellulosic paper and polyolefin tapes comprising two layers of paper and an interposed layer of polyolefin, the said layers making up a tape being coextensive and being bonded together throughout their extent.

14. An electric cable according to claim 13 in which the polyolefin layers have openings therethrough for the passage of fluid.

15. An electric power cable according to claim 14 in which the polyolefin layers have a multiplicity of substantially uniformly distributed small perforations.

16. An electric power cable according to claim 15 in which the individual perforations do not exceed about $1/32$ of an inch in diameter.

17. An electric power cable according to claim 15 in which the aggregate area of the perforations is at least about 1% of the total area of the layer.

18. An electric power cable according to claim 15 in which the aggregate area of the perforations does not exceed about 10% of the total area of the layer.

19. An electric power cable according to claim 15 in which the cellulosic paper is impregnated with oil and in which the helical spaces between the turns in the wrappings and the perforations in the polyolefin tape are filled with dielectric fluid under pressure.

20. A high voltage electric power cable comprising a conductor insulated with overlying helical wrappings of composite cellulosic paper and polyolefin tapes, the composite tapes comprising coextensive layers of paper and polyolefin bonded together with paper layers forming both outer tape surfaces, insulating oil impregnating the paper, an impervious sheath enclosing the insulated conductor, and a body of insulating fluid under pressure filling the sheath.

21. A high voltage electric power cable according to claim 20 in which the dissipation factor is less than 0.15%.

References Cited by the Examiner

UNITED STATES PATENTS

| | | | |
|---|---|---|---|
| 3,077,514 | 2/63 | Kang | 174—120 |
| 3,078,333 | 2/63 | Kang | 174—120 |

FOREIGN PATENTS

| | | |
|---|---|---|
| 446,723 | 2/48 | Canada. |

LARAMIE E. ASKIN, *Primary Examiner.*

JOHN P. WILDMAN, JOHN F. BURNS, *Examiners.*